United States Patent [19]

Wilkinson et al.

[11] 4,338,268

[45] Jul. 6, 1982

[54] OPEN CYCLE THERMAL BOOSTING SYSTEM

[75] Inventors: William H. Wilkinson, Columbus; William T. Hanna, Gahanna, both of Ohio

[73] Assignee: Battelle Development Corporation, Columbus, Ohio

[21] Appl. No.: 177,660

[22] Filed: Aug. 13, 1980

[51] Int. Cl.³ .................................................. B01F 3/04
[52] U.S. Cl. ................................... 261/140 A; 62/305; 62/484; 62/494; 165/60; 261/151; 261/153; 261/155; 261/156
[58] Field of Search ............... 261/112, 140 R, 140 A, 261/153, 155, 156, 151; 62/305, 476, 484, 494, 101, 102; 165/60

[56] References Cited

U.S. PATENT DOCUMENTS

| | | | |
|---|---|---|---|
| 600,298 | 3/1898 | Tackle | 261/153 |
| 735,376 | 8/1903 | Hobart | 261/153 |
| 898,935 | 9/1908 | Sladek et al. | 261/153 |
| 1,975,267 | 10/1934 | Goldthwaite | 261/153 X |
| 2,178,883 | 11/1939 | Siedle | 261/140 A |
| 2,251,746 | 8/1941 | Lescarbeau | 62/494 X |
| 2,356,530 | 8/1944 | Pflock | 261/153 |
| 2,541,757 | 2/1951 | Grier | 261/140 R |
| 2,601,493 | 6/1952 | Barr | 261/153 |
| 3,291,568 | 12/1966 | Sautter | 261/153 X |
| 3,894,133 | 7/1975 | Coste | 261/153 |
| 4,089,186 | 5/1978 | Rojey et al. | 62/101 |
| 4,094,355 | 6/1978 | Blytas | 62/101 X |
| 4,102,388 | 7/1978 | Blytas | 62/101 X |
| 4,167,101 | 9/1979 | Rojey | 62/102 |

OTHER PUBLICATIONS

Takaada, "Large Heat Pumps & Exhaust Heat Recovery", Refrigeration & Air Conditioning, vol. 26, No. 310, 12-19-75.
Wade et al., "Low Temperature Solar Industrial Cooling System", Proceedings, Institute of Environmental Sciences.
Williams et al., "A Heat Pump Powered by Natural Thermal Gradients", presented at 9th IECE Conference—Aug. 26-30, 1974.
Cohen et al., "A New Absorption-Cycle Process for Upgrading Waste Heat"—American Chemical Society—(1979).
Cohen et al., "Valorisation de Calories a Bas Niveau Au Moyer de Cycles Trithermes", Entropie, No. 84 (Nov.-Dec. 1978) updated publication, Upgrading Thermal Wastes in Industry IFP Thermosorb Process.

Primary Examiner—Richard L. Chiesa
Attorney, Agent, or Firm—Biebel, French & Nauman

[57] ABSTRACT

Countercurrent flow absorber and desorber devices are provided for use in absorption cycle refrigeration systems and thermal boosting systems. The devices have increased residence time and surface area resulting in improved heat and mass transfer characteristics. The apparatuses may be incorporated into open cycle thermal boosting systems in which steam serves both as the refrigerant vapor which is supplied to the absorber section and as the supply of heat to drive the desorber section of the system.

13 Claims, 5 Drawing Figures

OPEN CYCLE THERMAL BOOSTING SYSTEM

This application is related to commonly assigned copending application Ser. No. 177,695, filed concurrently herewith.

BACKGROUND OF THE INVENTION

This invention relates to countercurrent flow heat exchange and mass transfer apparatus, and more particularly to countercurrent flow desorbers and absorbers for use in open cycle refrigeration and thermal boosting systems.

In many instances requiring refrigeration, rather than utilizing a mechanical refrigeration cycle, an absorption refrigeration cycle is used. Absorption refrigeration cycles are heat operated cycles in which a secondary fluid, the absorbent, is employed to absorb a primary fluid, the refrigerant, which has been vaporized in an evaporator. A basic absorption refrigeration cycle has five components—a desorber (commonly termed generator), a condenser, an evaporator, an absorber, and a solution pump.

In operation, heat is supplied to the desorber to boil off relatively high pressure refrigerant vapor. The vapor passes to the condenser where the refrigerant is condensed to provide a liquid at a relatively high pressure. The refrigerant then passes to an evaporator where it is flashed to form liquid and vapor fractions at a low pressure. Heat from a low temperature source is transferred into the system at this point providing the refrigeration effect as it vaporizes the liquid refrigerant. This vapor is then passed to an absorber where at least a portion of it is absorbed by an absorbent-refrigerant solution sprayed over the absorber surface. The solution pump pressurizes the collected absorbent-refrigerant solution and transfers it to the desorber to complete the cycle.

In thermal boosting systems utilizing a Rankine cycle evaporator coupled with a solution heat pump such as those disclosed by Bearint in copending U.S. application Ser. No. 139,051, now abandoned, filed Apr. 10, 1980, and commonly assigned, heat is supplied to an evaporator to produce a source of relatively high pressure refrigerant vapor. The vapor is then passed to the absorber where at least a portion of it is absorbed by an absorbent-refrigerant solution sprayed over it. The heats of condensation and solution released by the refrigerant supply the temperature boost. The absorbent-refrigerant solution is then passed to a desorber where refrigerant is vaporized at a relatively low pressure. The refrigerant vapor is then condensed and pumped to the evaporator to complete the cycle.

In both the refrigeration and thermal boosting systems, not only must efficient heat transfer occur in the absorber and desorber sections but also efficient mass transfer of refrigerant into and out of solution must occur. In prior refrigeration systems, the desorber section of the system consisted of a chamber having heat exchange tubes immersed in a pool of absorbent-refrigerant solution. Heat transfer was limited by the surface area of the tubes, residence time of the solution, and back mixing which occurred as new solution was fed into the chamber and as convective recirculation occurred in the pool. Mass transfer was similarly limited by the relatively small surface area of the pool of solution and lower temperature attainable because of inadequate heat transfer.

The absorber section of previous refrigeration systems also suffered from deficiencies in heat and mass transfer. Both heat and mass transfer were limited by relatively short residence times of the solution in the absorption chamber.

Accordingly, the need exists in the art for absorber and desorber apparatuses having improved heat and mass transfer characteristics.

SUMMARY OF THE INVENTION

The present invention meets that need by providing countercurrent flow apparatuses having increased contact areas and residence times to improve heat and mass transfer. The present invention also includes novel open cycle thermal boosting systems incorporating the improved counter current flow apparatus.

In one embodiment of the invention, heat exchange fluid is forced upwardly through a conduit while absorbent-refrigerant solution flows downwardly by gravity over the exterior surface of the conduit. Means are provided along the length of the conduit to cause local accumulations of solution to form to provide for additional residence time as well as additional surface area for mass transfer to occur.

In one configuration, a multiplicity of cup-like fins are positioned along the length of the conduit to collect the absorbent-refrigerant solution. The overflow of solution into succeeding fins provides excellent countercurrent flow heat exchange with the fluid in the conduit. The pools of solution formed in each cup-like fin present a large surface area for refrigerant to be absorbed into or be desorbed out of solution. Moreover, residence time for the system is increased by the holdup of solution in the fins allowing time for heat and mass transfer to occur.

In another embodiment of the invention, the heat exchange fluid containing conduit traces a serpentine path from the base to the top of a plate inclined from the horizontal. Absorbent-refrigerant solution is flowed downwardly over the conduit, and local pools of solution are formed as the solution builds up behind each succeeding section of conduit which acts as a weir. The serpentine path traced by the conduit approximates a countercurrent flow of heat exchange fluid and enhances heat transfer. Both residence time and mass transfer surface for the solution is increased as the solution builds up behind and then successively overflows each section of conduit.

When the apparatus of the present invention is utilized as an absorber, refrigerant vapor is absorbed into a solution of absorbent and refrigerant, which is initially lean in refrigerant (weak solution), as the solution flows downwardly over the heat exchange fluid containing conduit. The heats of condensation and solution released when refrigerant is absorbed into solution are transferred to the fluid in the conduit which increases in temperature. When the apparatus is used as a desorber, refrigerant vapor is driven off from a solution of absorbent and refrigerant, which is initially rich in refrigerant (strong solution), as the solution flows downwardly over the heat exchange fluid containing conduit. Heat is supplied via the heat exchange fluid to vaporize or desorb refrigerant from solution.

The countercurrent flow absorbers and/or desorbers of the present invention can also be incorporated into novel open cycle thermal boosting systems. An open cycle system is characterized by the fact that no evaporator is required because steam is utilized as the refrigerant vapor and is supplied directly to the absorber section of the apparatus. The open cycle systems comprise two or more pressurized chambers in a single unit or drum. In a preferred embodiment of the open cycle system, the unit comprises an inner cylindrical chamber with one or more outer annular chambers. In the inner cylindrical chamber, one or more countercurrent flow absorbers are positioned so that refrigerant vapor entering the chamber is absorbed into the working solution in pools formed along the length of the absorber. The latent heats of condensation and solution given up by the vapor are transferred to the heat exchange fluid in the conduits for external process use.

The other wall of the inner cylindrical chamber acts as a heat transfer surface, supplying heat from the condensing refrigerant vapor in the chamber to desorb refrigerant as vapor from a working solution of refrigerant and absorbent running down the other side of the wall. Residence time and heat transfer surface are increased by constructing the wall of the chamber to have a multiplicity of convolutions running generally horizontally around the chamber wall. Alternatively, if the open cycle apparatus is used in a system where there is an existing condenser, the desorbed refrigerant vapor can be sent directly to the existing condenser.

In the outer annular chamber, refrigerant vapor desorbed from the working solution running down the inner wall of the chamber migrates across the chamber and is condensed on the outer wall of the chamber by a supply of cooling water on the outside of that wall. Again, the wall may be constructed to have a multiplicity of convolutions running generally horizontally around the chamber wall.

It is also within the scope of this invention to utilize the countercurrent flow absorber and desorber apparatuses disclosed herein in more complex thermal boosting systems such as those disclosed in commonly assigned copending U.S. applications Ser. Nos. 177,663 and 177,680, both filed concurrently herewith.

Accordingly, it is an object of the present invention to provide absorber and desorber devices for use in both absorption cycle refrigeration systems and open cycle thermal boosting systems having improved heat and mass transfer characteristics. This and other objects and advantages of the invention will become apparent from the following description, the accompanying drawings, and the appended claims.

DESCRIPTION OF THE PREFERRED EMBODIMENTS

Figure 1:
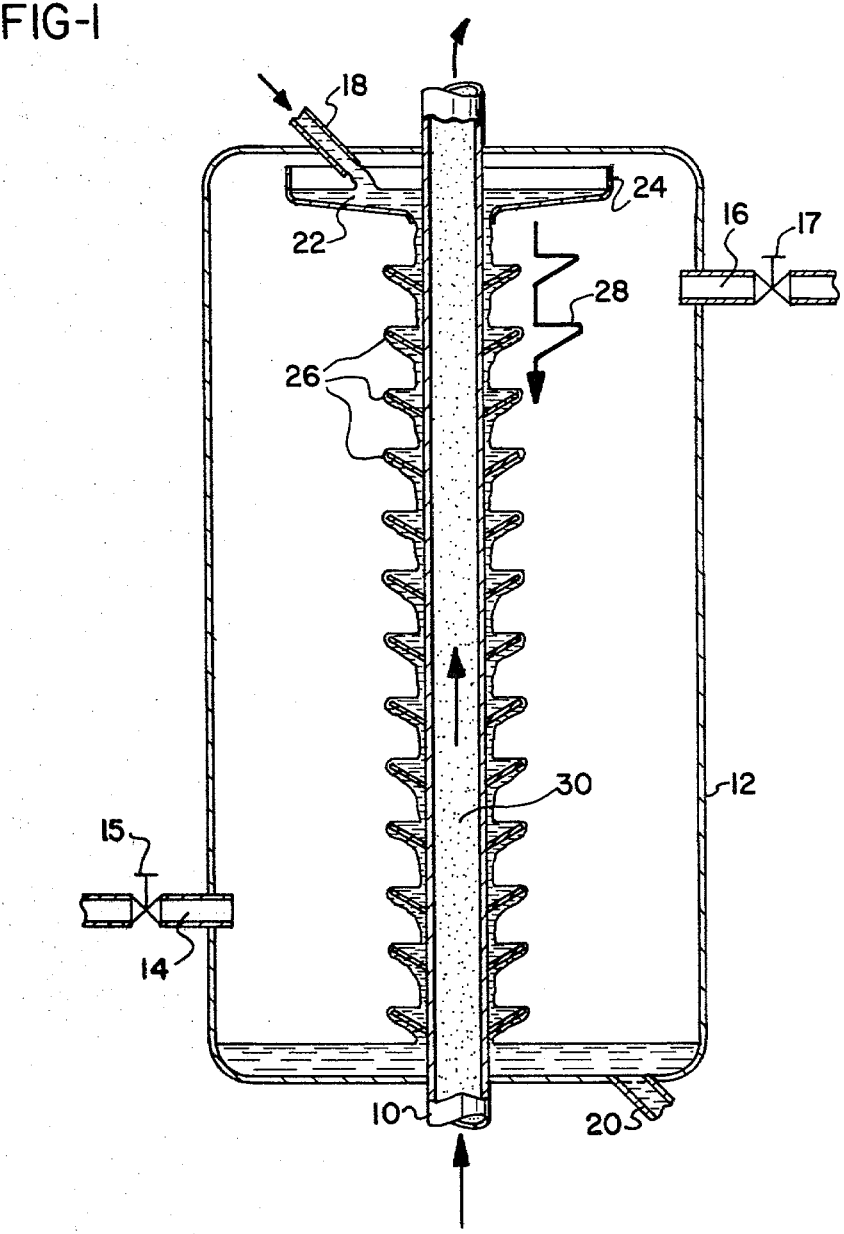
FIG. 1 is a sectional side view of one embodiment of the countercurrent flow apparatus which can be utilized in the present invention.

Referring to FIG. 1, one embodiment of the countercurrent flow heat exchange and mass transfer apparatus has a generally vertically oriented conduit 10 centrally located within chamber 12. Chamber 12 has an inlet 14 and an outlet 16 for refrigerant vapor. Either may be opened or closed off at valves 15 and 17, respectively, depending upon in what mode the device is operated. Chamber 12 also has an inlet 18 and an outlet 20 for the working solution 22 of absorbent and refrigerant.

A distribution pan 24 is provided near the top of chamber 12 for supplying working solution 22 to the exterior of conduit 10. A plurality of cup-like fins 26 are arranged along the length of conduit 10, catching and temporarily holding working solution 22 as it falls. Cup-like fins 26 not only serve to increase the residence time of solution 22 in chamber 12 but also provide large mass transfer surface areas for the transfer of refrigerant vapor into or out of solution. The number, diameter, and angle of attachment of fins 26 can all be varied depending upon the desired residence time and heat and mass transfer characteristics of the system.

When operated as an absorber, refrigerant vapor enters chamber 12 through inlet 14 (outlet 16 being closed) and contacts the working solution of refrigerant and absorbent falling generally along the path indicated by arrow 28. As vapor is absorbed into solution, it releases latent heats of condensation and solution and raises the temperature of solution 22. Heat is transferred from solution 22 through the wall of conduit 10 to the heat exchange fluid 30 flowing upwardly therethrough. The countercurrent flow of the fluids through the device creates a large driving force for heat transfer as the very hot working solution leaving chamber 12 contacts the relatively cooler incoming fluid in conduit 10.

When operated as a desorber, a working solution which is relatively rich in refrigerant is supplied through inlet 18 and flows downwardly over cup-like fins 26 along conduit 10. The solution is heated by the relatively hotter fluid flowing through conduit 10. This heat causes refrigerant to be desorbed as vapor and carried out of chamber 12 through outlet 16 (inlet 14 being closed). The large surface areas of solution pools formed in cup-like fins 26 provide the needed area for mass transfer to occur.

The configuration shown in FIG. 1 is intended to be typically descriptive and other arrangements are anticipated within the scope of the invention. For instance, perforations may be utilized in the cup-like fins to improve distribution of solution over the outer surfaces as the fluid flows from cup-to-cup. Such perforations could be slots, holes or notched edges. Continuous helical fins, cup shaped to improve containment of the solution, would also provide a similar increase of solution residence time as local collections of solution occur.

Figure 2:
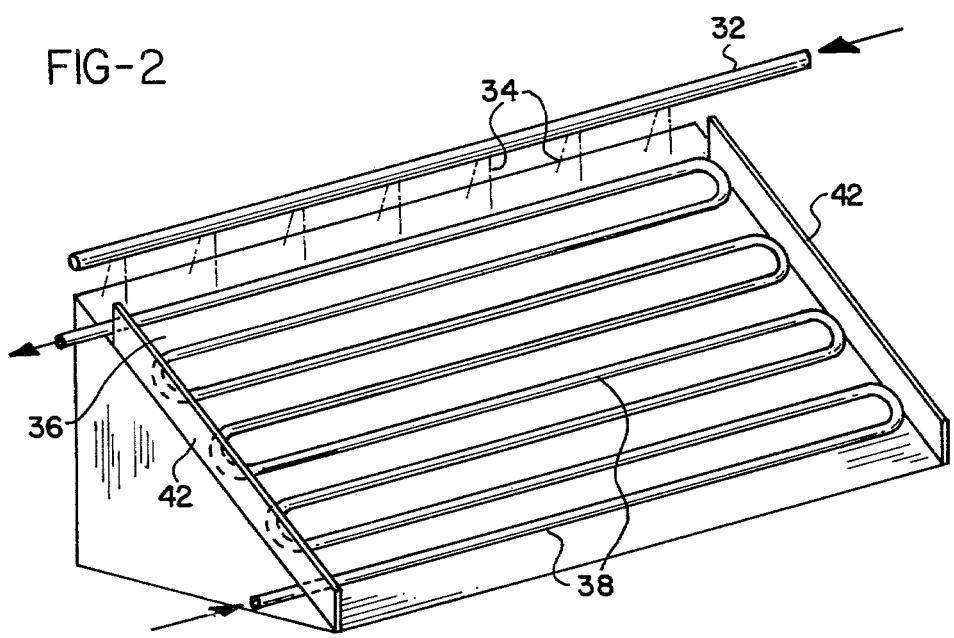
FIG. 2 is a perspective view of another embodiment of the counterflow apparatus which can be utilized in the present invention.
Figure 3:
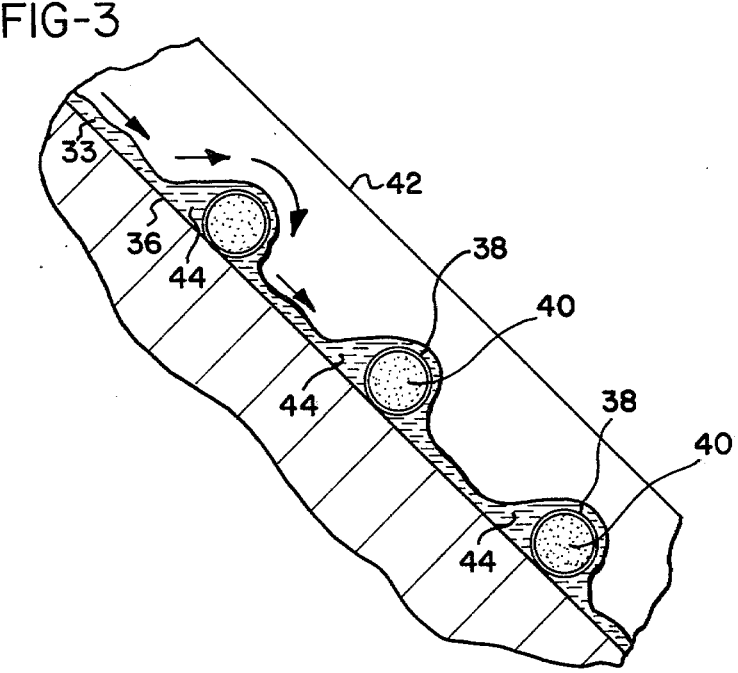
FIG. 3 is an enlarged cross-section of a portion of the apparatus of FIG. 2.

In another embodiment of the invention, as illustrated in FIGS. 2 and 3, a distribution conduit 32 supplies a working solution 33 of refrigerant and absorbent through nozzles 34 to the upper surface of inclined substrate 36. As the working solution flows downwardly over substrate 36 it encounters conduit 38 which is arranged in a serpentine path on substrate 36 in a direction generally transverse to the flow of solution 33. Heat exchange fluid 40 in conduit 38 enters near the base of substrate 36 and flows upwardly until it exits the device near the upper edge of substrate 36. In this manner, the flow of fluid through conduit 38 approximates a countercurrent flow scheme with respect to the direction of flow of working solution 33. Walls 42 at each side of substrate 36 confine the flow of solution.

As best shown in FIG. 3, working solution 33 flows downwardly over conduit 38 and forms pools 44 of solution along each section of conduit 38 which provide large surface areas for mass transfer to occur. The temporary holdup of solution at each pool 44 also serves to increase the residence time of the solution in the device. The entire device is enclosed by a housing (not shown) which controls the ingress and egress of refrigerant vapor to the device.

When operated as an absorber, working solution 33, lean in refrigerant, is sprayed from nozzles 34 onto substrate 36 and flows downwardly over its surface. Refrigerant vapor is absorbed into solution 33, and the latent heats of condensation and solution given off are transferred through conduit 38 to the heat exchange fluid 40 flowing therethrough. When the device is operated as a desorber, solution 33, which is rich in refrigerant, is heated by the heat supplied from the heat exchange fluid 40 in conduit 38 to desorb refrigerant as vapor from solution.

Figure 5:
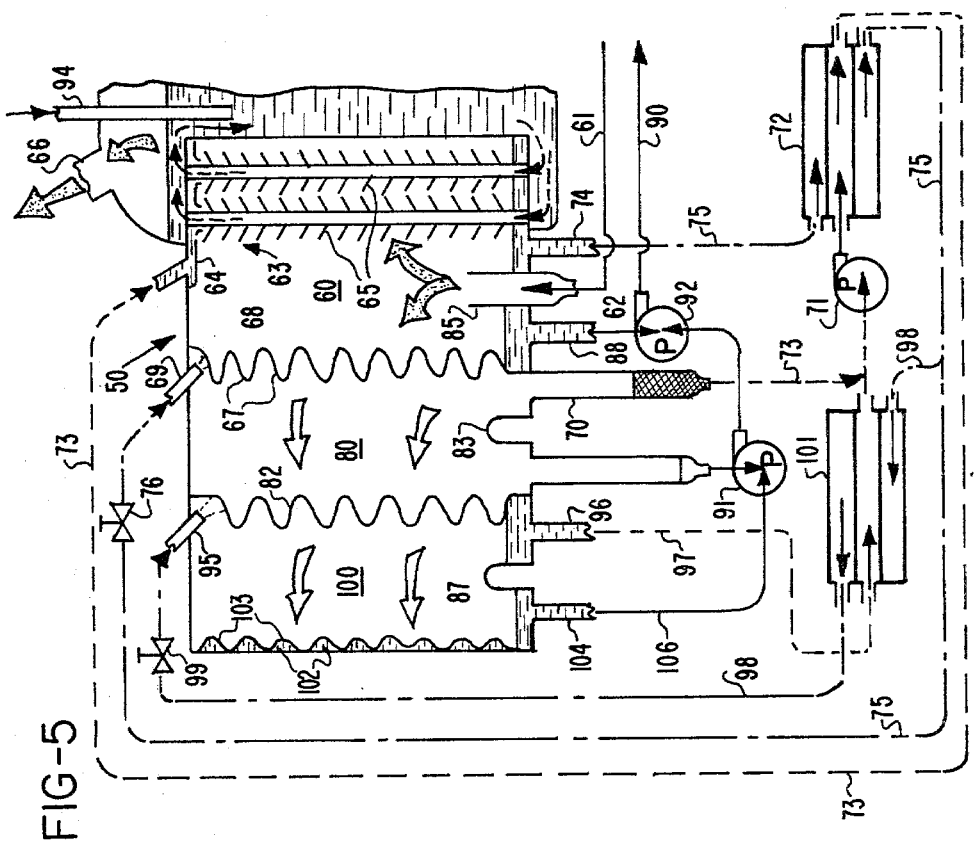
FIG. 5 is a schematic illustration of another open cycle thermal boosting system having a counterflow apparatus incorporated therein.

The counterflow apparatus may be incorporated into standard absorption cycle refrigeration systems as replacements for the absorber and/or desorber sections of such systems. Moreover, such apparatus can also be incorporated into the novel open cycle thermal boosting systems of the present invention. In such open cycle systems, a lithium bromide absorbent, water refrigerant pair is utilized. The need for an evaporator is eliminated by supplying steam (refrigerant vapor) directly to the absorber. Condensed water is recycled and used as the heat exchange fluid in the absorber. Examples of such systems are shown in FIGS. 4 and 5.

Figure 4:
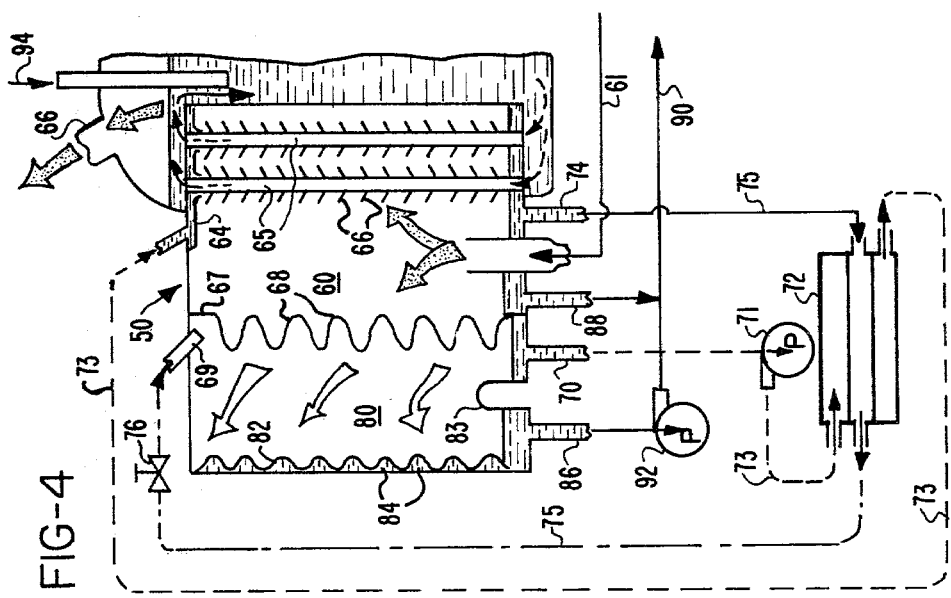
FIG. 4 is a schematic illustration of a counterflow apparatus incorporated into the open cycle thermal boosting system of the present invention.

As illustrated in partial section in FIG. 4, the system is contained in a closed generally cylindrical drum 50 having an inner cylindrical chamber 60 and an outer annular chamber 80. Steam from an available process source in line 61 enters chamber 60 through inlet 62. A portion of the steam contacts and is absorbed in absorber section 63 into a working solution of refrigerant and absorbent which is initially lean in refrigerant. Solution is supplied to distribution pan 64 and then flows down the external walls of conduits 65, temporarily collecting in the series of cup-like fins 66 arranged along the length of the conduits. As explained above, the latent heats of condensation and solution released are transferred at boosted temperature levels to the heat exchange fluid in conduit 65. In a preferred embodiment, this heat exchange fluid is water from which process steam is generated which can be used directly to supply external heat or process requirement via outlet 66.

Another portion of the incoming low pressure steam from inlet 62 is used to supply heat to the outer wall 67 of inner chamber 60 to desorb refrigerant from solution. As shown, the outer wall contains convolutions 68 running generally horizontally around the circumference of wall 67. Preferably, the convolutions are designed to provided extended, relatively horizontal surfaces for a film of solution to build up on. On the opposite side of wall 67, a working solution of absorbent and refrigerant initially rich in refrigerant is flowed from inlet conduit 69 down the wall. The heat supplied from steam on the other side of the wall causes a portion of the refrigerant, in this case water, to desorb from the solution as vapor. The lean-in-refrigerant solution is collected in sump 70 and then recycled to the countercurrent flow absorbers 63 by pump 71 through recuperative heat exchanger 72 and line 73. The hot rich (in refrigerant) solution leaving absorber section 63 is collected in sump 74 and is sent through recuperative heat exchanger 72 via line 75 where it gives up a portion of its heat to the lean solution in line 71 before being recycled through control valve 76 to the outer surface of wall 67 (desorber). Weirs 83 and 85 maintain the separation of condensed refrigerant from working solution.

In outer annular chamber 80, refrigerant vapor desorbed from solution migrates to the inner surface of outer wall 82. There, cooling water 84 on the outer surface of wall 82 causes the refrigerant vapor to condense. As shown, wall 82 may contain convolutions through which the cooling water is circulated. Condensate is collected in sump 86, and, together with the condensate collected in sump 88 is pumped through line 90 by pump 92 for discharge or optional recycle. If high purity condensate can be obtained, it can be recycled and added to any feed water through condensate return 94 and used as heat exchange fluid for the absorber section of the apparatus. Alternatively, if the open cycle apparatus is used in a systen where there is an existing condenser, the desorbed refrigerant vapor can be sent directly to the existing condenser. This would eliminate the need for cooling water 84 and sump 86.

In the embodiment of the invention illustrated in FIG. 5, with like reference numerals indicating like components, an additional annular outer chamber 100 having additional desorber and condenser sections has been included in the system. The internal staging made possible by the additional desorber and condenser enables a greater coefficient of performance to be attained by this system, where the coefficient of performance is defined as the ratio of the boosted heat output to the heat input to the system.

The additional desorber section is supplied with working solution from inlet 95. As shown, wall 82 is convoluted and provides extended, relatively horizontal surfaces for films of working solution to form as the solution flows downwardly over the wall. The heat supplied from steam on the other side of wall 82 causes a portion of the refrigerant in solution to desorb as vapor. The lean-in-refrigerant solution is collected in sump 96 and then is combined with the condensate in sump 70 and recycled to the countercurrent flow absorbers 63 via line 97, recuperative heat exchanger 99, pump 71 and line 73. A portion of the rich (in refrigerant) working solution in line 75 is split off into line 98 where it gives up some heat to the solution in line 97 in heat exchanger 101 and then is returned through control valve 99 to inlet 95.

Refrigerant vapor from the solution on wall 83 migrates to the inner surface of outer wall 103. There, cooling water 102 on the outer surface of the wall causes the refrigerant vapor to condense. As shown, wall 103 may contain convolutions through which the cooling water is circulated. Condensate is collected in sump 104 and is transferred via line 106 to pump 91 where it is combined with the condensate from sump 86 and sent to pump 92. As before, the condensates may be discharged or returned to the system through condensate return 94.

While the apparatuses herein described constitute preferred embodiments of the invention, it is to be understood that the invention is not limited to these precise forms of apparatus, and that changes may be made therein without departing from the scope of the invention. For example, the countercurrent flow absorbers and desorbers of the present invention can be incorporated into more complex thermal boosting systems including those systems described in commonly assigned, copending U.S. application Ser. No. 177,663, filed concurrently herewith.

What is claimed is:

1. Open cycle thermal boosting apparatus comprising, a pressurized housing having an inner chamber and at least one annular outer chamber around said inner chamber; said inner chamber including inlet means for supplying high pressure refrigerant vapor, inlet means for supplying a heat exchange fluid, means for contacting said refrigerant vapor with a first working solution of absorbent and refrigerant to absorb at least a portion of said vapor into solution whereby heat at an elevated temperature level is given off to said heat exchange fluid, said inner chamber including inlet means for said first working solution and outlet means for said heat exchange fluid associated with said contacting means, means for collecting said first working solution leaving said contacting means, the outer wall of said inner chamber providing a heat exchange surface for condensing refrigerant vapor, and means for collecting the condensed refrigerant; said annular outer chamber including means for supplying a second working solution of absorbent and refrigerant to the inner wall of said outer chamber, said inner wall being in heat exchange communication with the outer wall of said inner chamber and serving as a desorber means to desorb refrigerant as vapor from said second working solution, and means to collect said refrigerant vapor and said second working solution as they leave said desorber means.

2. The apparatus of claim 1 in which the outer wall of said outer chamber is in heat exchange communication with a source of relatively lower temperature fluid, the inner surface of said outer wall serving as a means to condense refrigerant vapor desorbed from said second working solution, and means to collect the condensed refrigerant.

3. The apparatus of claim 1 wherein said contacting means includes at least one generally vertically oriented conduit means for transporting said heat exchange fluid, means for supplying said first working solution to an external surface of said conduit means, said first working solution flowing in a direction opposite the direction of flow of said heat exchange fluid and being in heat exchange communication with said heat exchange fluid through the wall of said conduit means, and means arranged along the length of said conduit means for collecting portions of said first working solution and providing a plurality of surfaces for mass transfer of said refrigerant vapor into said solution to occur.

4. The apparatus of claim 3 in which the outer walls of said inner and outer chambers contain a multiplicity of convolutions running generally horizontally around said walls.

5. The apparatus of claim 1 including first means for recycling the working solution leaving said desorber means to said inlet for said first working solution in said inner chamber.

6. The apparatus of claim 5, including second means for recycling the working solution leaving said contacting means to said means for supplying working solution to said inner wall of said outer chamber.

7. The apparatus of claim 6 including means for exchanging heat between said first and second recycling means.

8. The apparatus of claim 1 including a second annular outer chamber surrounding the first annular outer chamber, said second annular chamber including means for supplying a third working solution of absorbent and refrigerant to the inner wall of said second outer chamber, said inner wall being in heat exchange communication with the outer wall of said first outer chamber and serving as a second desorber means to desorb refrigerant as vapor from said third working solution, means to collect said third working solution as it leaves said second desorber means, an outer wall in heat exchange communication with a source of relatively lower temperature fluid, the inner surface of said outer wall serving as a means to condense refrigerant vapor desorbed from said third working solution, and means to collect the condensed refrigerant.

9. The apparatus of claim 8 including first means for recycling the working solution leaving said second desorber means to said inlet for said first working solution in said inner chamber.

10. The apparatus of claim 9 including second means for recycling the working solution leaving the desorber means in the first annular outer chamber to said inlet for said first working solution in said inner chamber.

11. The apparatus of claim 10 including third means for recycling the working solution leaving said contacting means to said means for supplying working solution to said inner walls of said first and second annular outer chambers.

12. The apparatus of claim 11 including means for exchanging heat between said first and third recycling means.

13. The apparatus of claim 12 including means for exchanging heat between said second and third recycling means.

* * * * *